Figure 1:
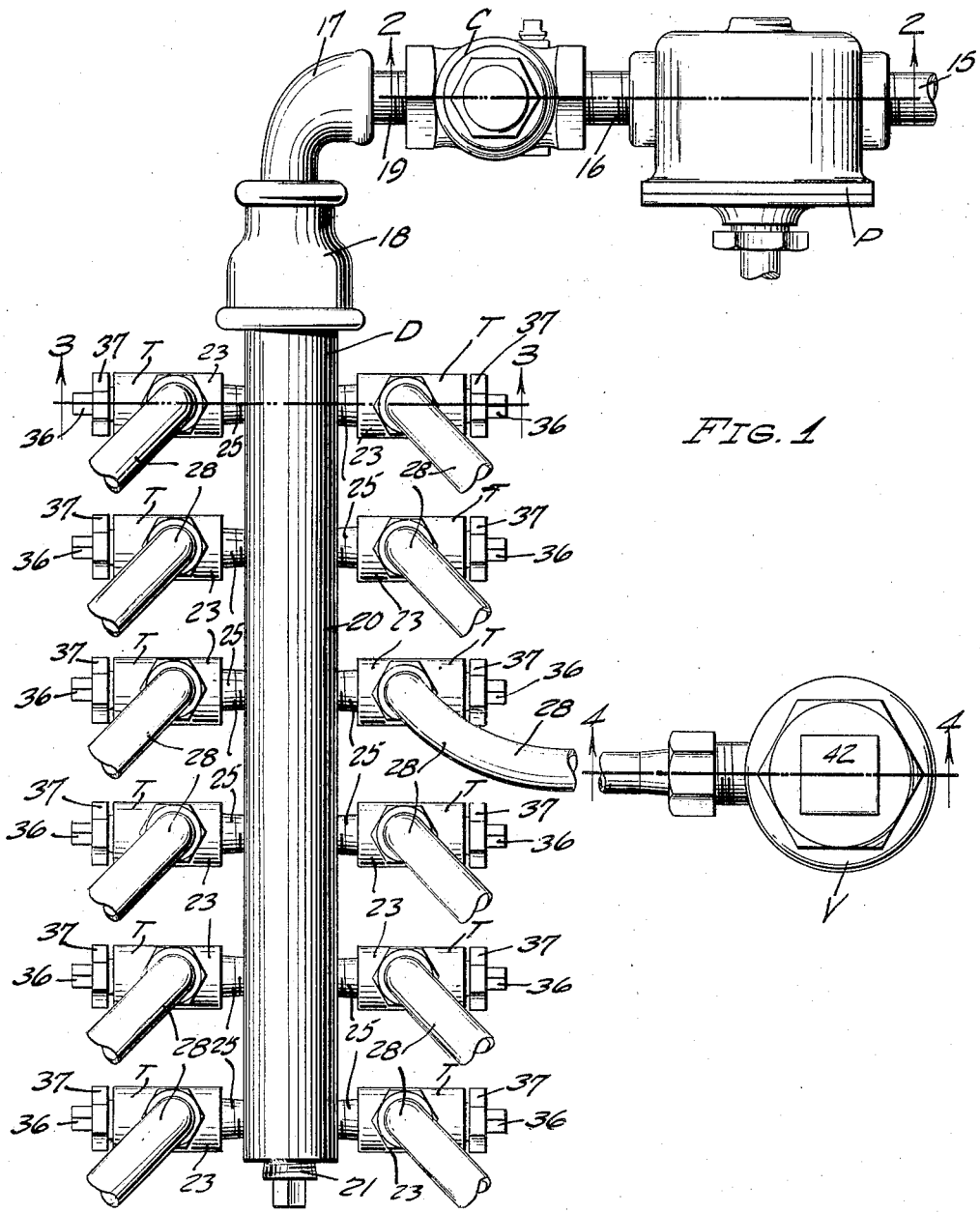

March 14, 1933.   D. GRATTAN   1,901,027
FORCE FEED LUBRICATING APPARATUS
Filed May 22, 1928   2 Sheets-Sheet 2
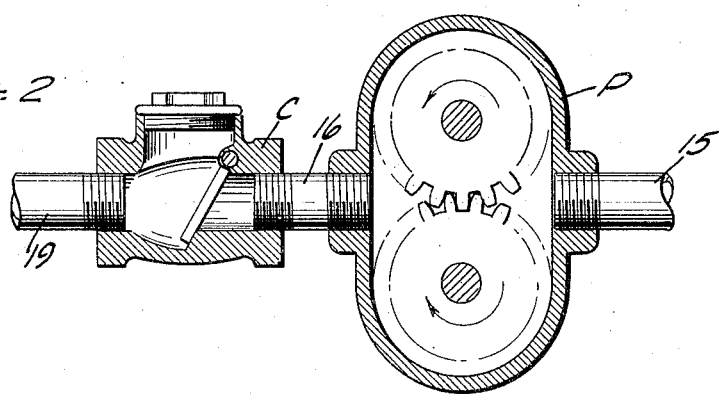
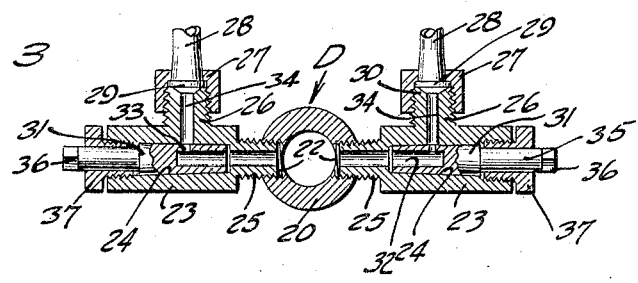
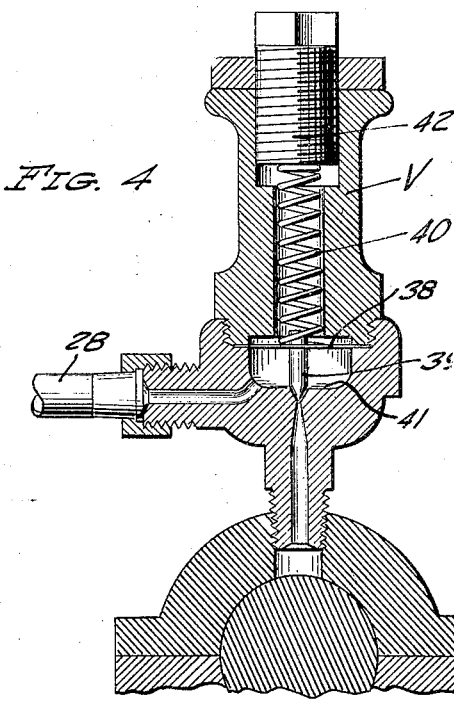
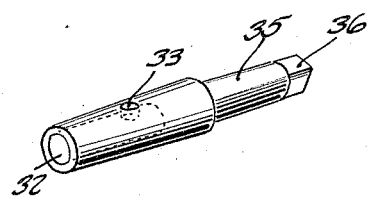
INVENTOR
DAVID GRATTAN
BY Munn & Co.
ATTORNEY Patented Mar. 14, 1933

1,901,027

UNITED STATES PATENT OFFICE

DAVID GRATTAN, OF LOS ANGELES, CALIFORNIA

FORCE FEED LUBRICATING APPARATUS

Application filed May 22, 1928. Serial No. 279,750.

It is the object of my invention to provide a force feed lubricating system particularly adapted for steam engines or for any parts where pressures exist tending to prevent the delivery of oil to such parts, and by which lubricating system oil can be positively delivered concurrently to a multiplicity of parts against counter pressures existing at the parts, all irrespective of the lengths of oil conduits leading to the parts, and without loss of oil from the system should the counter pressure cease.

I will describe only one form of force feed lubricating apparatus and one form of distributor element each embodying my invention, and will then point out the novel features thereof in claims.

In the accompanying drawings:

Fig. 1 is a view showing in plan one form of lubricating apparatus embodying my invention having embodied therein one form of distributor element embodying my invention;

Figs. 2, 3, and 4 are sectional views taken on the lines 2—2, 3—3, and 4—4, respectively, of Fig. 1; and Fig. 5 is a detail view showing in perspective one of the distributing valves of the distributor element.

Similar reference characters refer to similar parts in each of the several views.

Referring specifically to the drawings, and particularly to Fig. 1, my invention in its present embodiment comprises an apparatus, the major elements of which are a pump P, a distributor element D, and a plurality of individual valves V, only one of the latter being illustrated to simplify the drawings, and as shown in Fig. 4 connected to a part of the engine to be lubricated. The pump P may be of the rotary type as shown in Fig. 2, although it is to be understood that any suitable form of pump can be employed. By means of a pipe 15 this pump is adapted for connection to a source of oil supply, and by a pipe 16 to a check valve C, the latter being preferably but not necessarily, of the construction illustrated in Fig. 2, and designed for the purpose of preventing retrograde movement of the oil as will be understood.

By means of an elbow 17, a collar 18, and a short length of pipe 19, the check valve C is connected to the distributor element D so that oil under pressure from the pump P will be supplied to such element.

The distributor element D comprises in the present instance an elongated tubular body or head 20, one end of which is open and exteriorly threaded for connection with the collar 18. The opposite end of the body is normally closed by a screw plug 21, the latter being provided for the purpose of gaining access to the interior of the body to permit cleaning thereof. Preferably at spaced intervals along the length of the body 20 openings 22 are formed therein, and the walls of these openings are screw-threaded for the reception of nipples by means of which latter a plurality of oil distributing valve units are mounted on the body so as to communicate with the interior thereof and to thus receive oil under pressure therefrom. As the construction of the several units is identical, a description of one will suffice for all.

Each unit T comprises a tubular body 23 having a conical or tapered bore 24 and an exteriorly threaded nipple 25 at one end of the body and adapted for threading within the opening 22, all as clearly shown in Fig. 3. A second nipple 26 is formed integral with the body 23 at a point between the ends of the latter, and this nipple is likewise exteriorly threaded for the reception of a connecting collar 27 by which an oil distributing conduit 28 can be connected to the nipple. The adjacent end of the conduit may be provided with a conical head 29 adapted to be forced tightly upon a conical seal 30 of the nipple 26 by screwing the collar downwardly on the nipple as will be understood. This conduit 28 is adapted for connection to a corresponding terminal valve V so that the oil as delivered to the corresponding valve unit T will be supplied to the terminal valve. Within the bore 24 a conical or tapered valve 31 is rotatable, and this valve is provided with a longitudinal passage 32 opening into the nipple 25, and a radial passage 33 communicating with the passage 32 and adapted to communicate with a duct 34 of the nipple 26. The valve is adapted to be manually rotated to move the passage 33 into or out of registration with the duct 34 by means of a stem 35 formed integral with the valve as shown in Fig. 5 and provided at its outer end with a squared head 36 to which latter a wrench may be applied for turning the valve. A sealing and retaining collar 37 is threaded in the outer end of the body 23 and in this collar the stem 35 is rotatable.

Each conduit 28 is connected to the corresponding valve V in the manner illustrated in Fig. 4. The valve V may be of any suitable construction to automatically control the passage of oil therethrough in accordance with the pressure of the oil, and although I have shown a specific form of valve it is to be understood that any suitable form can be employed.

As shown in Fig. 4, the valve V consists essentially of a diaphragm 38 carrying a needle valve 39 and is engaged by a spring 40 which yieldably flexes the diaphragm to normally close the valve. When oil entering the chamber 41 reaches a predetermined pressure the diaphragm is flexed upwardly to open the valve. By means of a screw plug 42 the tension of the spring 40 can be varied as desired to determine the oil pressure at which the diaphragm will be flexed to open the valve.

The operation of the apparatus is as follows:

Oil as placed under pressure by the pump P is delivered to the body 20 of the distributor element, and from the latter to the several valve units T through the nipples 25. From any one unit T the positive regulation of the amount of oil supplied to the corresponding valve V through the conduit 28 can be regulated as required by an adjustment of the corresponding valve 31. As any one valve unit T is operable independently of the other units, it will be manifest that such regulation of the amount of oil supplied to the corresponding valve V is independent of the regulation of oil to the other valves V. Therefore, in the lubrication of the moving parts of a steam engine by means of my apparatus, one is enabled to positively regulate the amount of oil distributed to any part of the engine provided with a valve. The paramount characteristic of my invention, however, is the fact that such individual and positive regulation can, through the provision of the distributor element D, be effected with the use of the single pump P as distinguished from previous apparatus in which a separate pump is required for each distributing unit and valve.

It will be manifest that by the provision in my system of the independently adjustable terminal valves V, that predetermined quantities of oil can be delivered concurrently to a multiplicity of parts against counter pressures set up at the parts, all irrespective of the lengths of the oil conduits, and without loss of oil from the system should the counter pressure cease, due to the fact that the terminal valves are located in proximity to the parts to be lubricated.

Although I have herein shown and described only one form of force feed lubricating apparatus embodying my invention, it is to be understood that various changes and modifications may be made herein without departing from the spirit of the invention and the spirit and scope of the appended claims.

I claim:

1. A force feed lubricating system including a plurality of distributing units and means for forcing lubricant under pressure to the units; each unit including an oil conduit leading from the unit to a part to be lubricated, a regulating valve for each unit by which the amount of oil flowing therethrough can be varied; a terminal valve for each conduit disposed in proximity to the part to be lubricated and having means responsive to a predetermined pressure of oil in the respective conduit, to deliver oil to the respective part; and means for each terminal valve by which the terminal valves can be adjusted independently of each other to insure that they will respond to one and the same pressure.

2. A force feed lubricating system including a plurality of distributing units and means for forcing lubricant under pressure to the units; each unit including an oil conduit leading from the unit to a part to be lubricated; a regulating valve for each unit by which the amount of oil flowing therethrough can be varied; a terminal valve for each conduit having means responsive to pressure from said first means which is superior to a counter pressure from the respective part, to deliver oil to the part; and means for each terminal valve by which the terminal valves can be adjusted independently of each other to open at one and the same pressure; the terminal valves being located in proximity to the respective parts to prevent loss of oil from the conduits should the counter pressure from such parts cease.

Signed at Los Angeles in the county of Los Angeles and State of California this 7th day of May, 1928 A. D.

DAVID GRATTAN.